United States Patent [19]
Vos

[11] Patent Number: 5,341,937
[45] Date of Patent: Aug. 30, 1994

[54] APPARATUS FOR SEPARATING RECYCLABLE WASTE

[75] Inventor: Dirk J. Vos, Veendam, Netherlands

[73] Assignee: Machinefabriek Bollegraaf Appingedam B.V., Appingedam, Netherlands

[21] Appl. No.: 991,439

[22] Filed: Dec. 16, 1992

[51] Int. Cl.⁵ .............................................. B03C 1/30
[52] U.S. Cl. .................................... 209/38; 209/44.2; 209/33; 209/631; 209/636; 209/644; 209/665; 209/226; 209/308; 209/930
[58] Field of Search .............. 209/12, 38, 44.2, 31–35, 209/629, 631, 632, 636, 638, 644, 657, 658, 665, 674, 218, 226, 308, 257, 393, 930–932

[56] References Cited

U.S. PATENT DOCUMENTS

| | | | |
|---|---|---|---|
| 719,178 | 1/1903 | Blum | 198/494 |
| 805,289 | 11/1905 | Heath | 209/218 |
| 2,617,515 | 11/1952 | Hohnecker | 198/494 X |
| 2,634,850 | 4/1953 | Hansen | 198/494 X |
| 3,372,806 | 3/1968 | Porter | 209/308 X |
| 3,677,403 | 7/1972 | Young et al. | 209/308 |
| 3,756,405 | 9/1973 | Fenska | 209/44.2 |
| 4,174,755 | 11/1979 | Siri | 209/308 X |
| 4,426,832 | 1/1984 | Porter | 209/308 X |
| 4,459,206 | 7/1984 | Laithwaite | 209/38 X |
| 4,787,461 | 11/1988 | Rogus | 209/308 X |
| 4,897,183 | 1/1990 | Lewis, Jr. et al. | 209/308 X |
| 4,911,827 | 3/1990 | Ryan et al. | 209/308 X |
| 4,929,342 | 5/1990 | Johnston | 209/38 X |
| 5,116,486 | 5/1992 | Pederson . | |
| 5,213,219 | 5/1993 | Griffin | 209/307 |

FOREIGN PATENT DOCUMENTS

| | | | |
|---|---|---|---|
| 853035 | 10/1970 | Canada | 209/44.2 |
| 465406 | 12/1951 | Italy | 209/218 |

Primary Examiner—D. Glenn Dayoan
Attorney, Agent, or Firm—Merchant & Gould Smith, Edell, Welter & Schmidt

[57] ABSTRACT

An apparatus for separating recyclable waste which has a conveyor belt transport track, collecting belt under a section of the transport track, and belt guides positioned along a section of the transport track. The conveyor belt is provided with openings and mutually contacting surfaces of the conveyor belt and the belt guides are profiled such that movement of the conveyor belt along the transport track causes a portion of the belt passing the guides to shake in a direction substantially transverse to the transport track.

32 Claims, 6 Drawing Sheets

APPARATUS FOR SEPARATING RECYCLABLE WASTE

FIELD OF THE INVENTION

The invention relates to an apparatus for separating recyclable waste.

BACKGROUND OF THE INVENTION

To facilitate recycling of waste, it has become common practice to dispose and collect recyclable waste separately. Taking account of the sorting skill and motivation of the general public and to maintain an acceptable efficiency of collection and handling, the number of separate categories into which waste is to be separated upon disposal is limited by collecting several categories of recyclable waste material in mingled form. Separately collected recyclable waste generally comprises metal (sometimes excluding aluminium), plastic and glass.

After collection, generally glass, plastics, metals responsive to magnetism (mainly steel) and, if present, metals not responsive to magnetism (mainly aluminium) are industrially separated from the mingled recyclable waste.

An apparatus and a method for separating recyclable waste materials is described in U.S. Pat. No. 5,116,486.

In this known apparatus, the separating process is carried out by first passing the waste material along a magnetic separator such as a magnetic pulley at an end of a belt conveyor for separating parts of magnetic-responsive material (mainly steel) from the other material. The remaining material is passed from the end of the conveyor belt into a second stage in which the remaining material is passed over a vibrating screen to separate parts smaller than a predetermined size from the other remaining material. From the vibrating screen the remaining material is introduced to an elongated slide along which an air stream separator is positioned. The air stream separator provides a stream or current of air in a direction transverse to the direction of movement of the remaining material carrying away specifically lighter materials such as plastic and aluminium cans from the heavier, mostly glass objects, which remain in the slide, and discharging the specifically lighter objects onto a second conveyor along which manual sorting can take place. Finally, the heavier objects are deposited onto a third conveyor along which manual sorting can also take place.

A problem of apparatuses such as the above described known apparatus is that breaking of glass objects occurs very frequently. Preferably, glass objects should remain intact to facilitate further sorting, for example with respect to colour, and to reduce the injury-risks of personnel if the further sorting is carried out manually.

Another problem is, that manufacturing costs of the combination of such apparatuses, in particular of the vibrating screen devices and the like, are high.

Still another problem is, that during operation, the known apparatuses emit undesirably much noise.

The invention is aimed at providing an apparatus for separating recyclable waster material, and in particular an apparatus for separating small objects out of recyclable waste, in which breakage of glass objects occurs less frequently.

The invention is also aimed at providing an apparatus for performing the above-mentioned function which is of a simple, light and cost-efficient construction.

Furthermore, it is an object of the invention to provide an apparatus for performing the above-mentioned function which emits less noise during operation.

SUMMARY OF THE INVENTION

According to the present invention, these objects are achieved in an apparatus for separating recyclable waste comprising a conveyor belt transport track, collecting means under a section of the transport track, and belt guides positioned along said section of the transport track. The conveyor belt is provided with openings. At least one of mutually contacting surfaces of the conveyor belt and the belt guides is profiled such that movement of the conveyor belt along the transport track causes a portion of the belt passing the guides to shake in a direction substantially transverse to the transport track.

In an apparatus according to the present invention, the waste material is transported in the direction of the transport track by the continuous movement of the conveyor belt in that direction. Thus a well controlled transport of the material in the direction of the transport track is obtained, independent from the intensity of the vibrations and without random build-up of kinetic energy in parts sliding down an inclined surface. The shaking action can be of a relatively low intensity because its only purpose is to cause the smaller objects to fall through the openings in the conveyor belt. During the shaking action, the parts of the waste material that do not fall through the openings virtually do not move in the direction of the transport track with respect to the portion of the conveyor belt carrying these parts. This brings about a reduction of the number of occurrences of collisions between parts falling onto each other.

Due to the above effects of the invention, a substantial reduction of glass breakage is achieved.

Since the shaking action is achieved by guiding the conveyor belt in such a manner that only parts passing predetermined positions along the transport track are moved transversely to the transport track, no additional means for driving the shaking motion are required. Moreover, at any moment during operation, only parts of the conveyor belt are being shaked. Consequently, at any moment, the total weight of the parts that are being shaked is relatively low, so the shaking action causes only relatively small oscillating loads. For these reasons, the apparatus according to the invention can be of a relatively light construction which can be manufactured at low cost.

Furthermore the noise emitted during operation of the apparatus according to the invention is relatively low due to the reduced number of collisions between parts of the waste material and the reduced impact of such collisions.

In addition, due to the relatively small oscillating loads exerted during operation, vibrations transmitted to the surroundings during operation are of relatively low intensity.

DETAILED DESCRIPTION OF THE INVENTION

Figure 1:
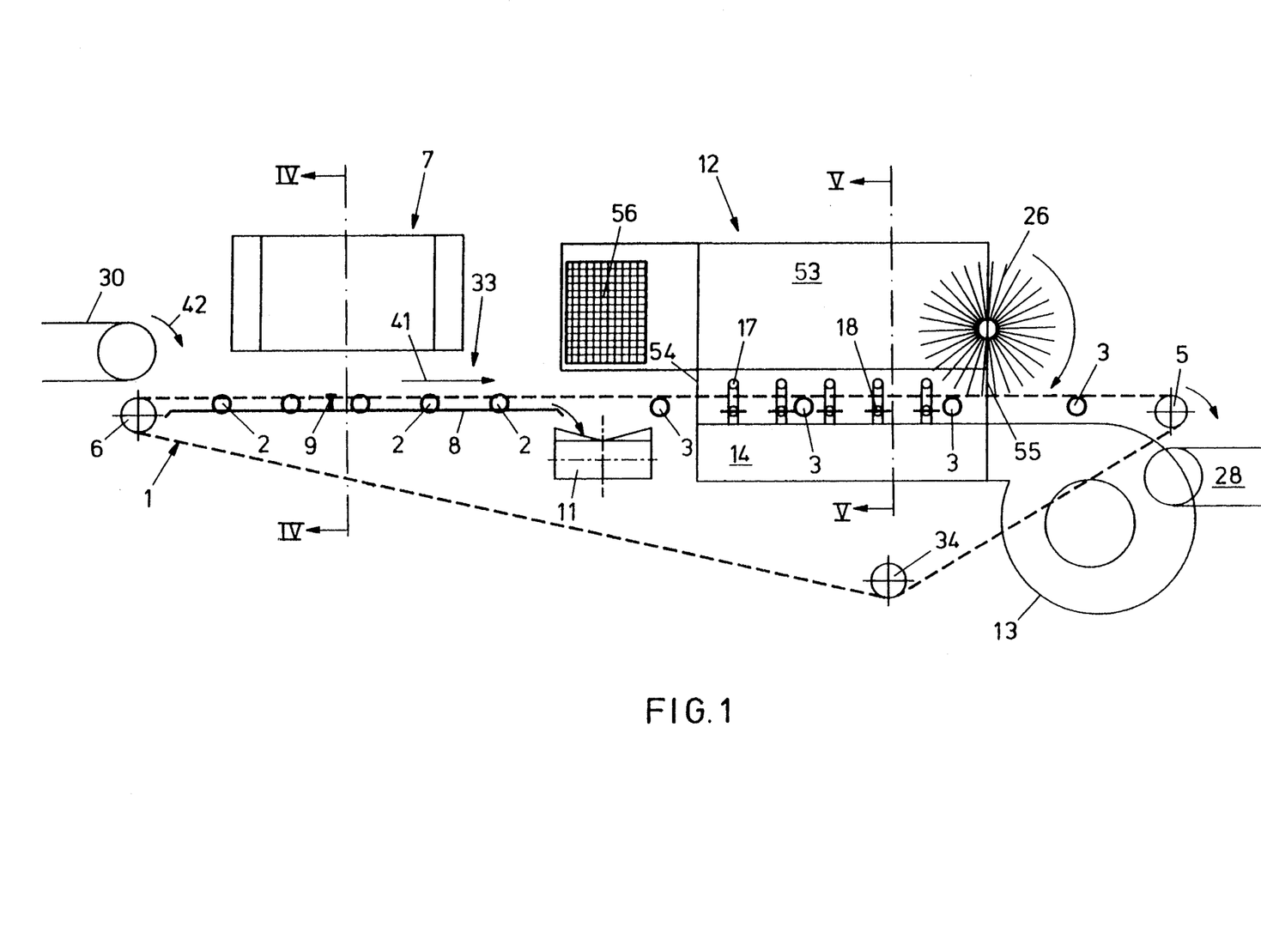
FIG. 1 is a schematic side view of an apparatus according to the most preferred embodiment of the invention positioned between a feeder and a discharge conveyor.
Figure 2:
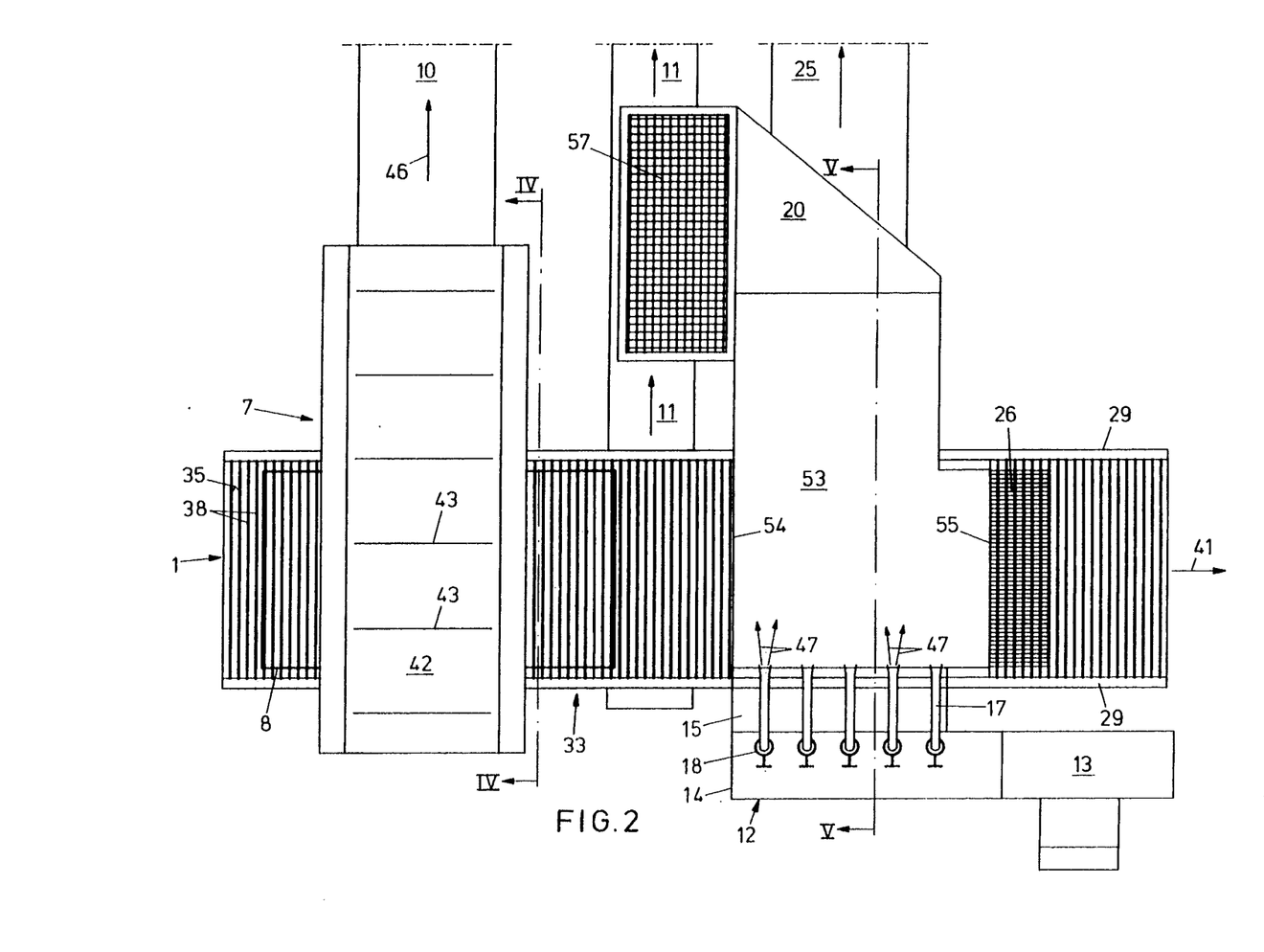
FIG. 2 is a schematic top plan view of the apparatus shown in FIG. 1.
Figure 3:
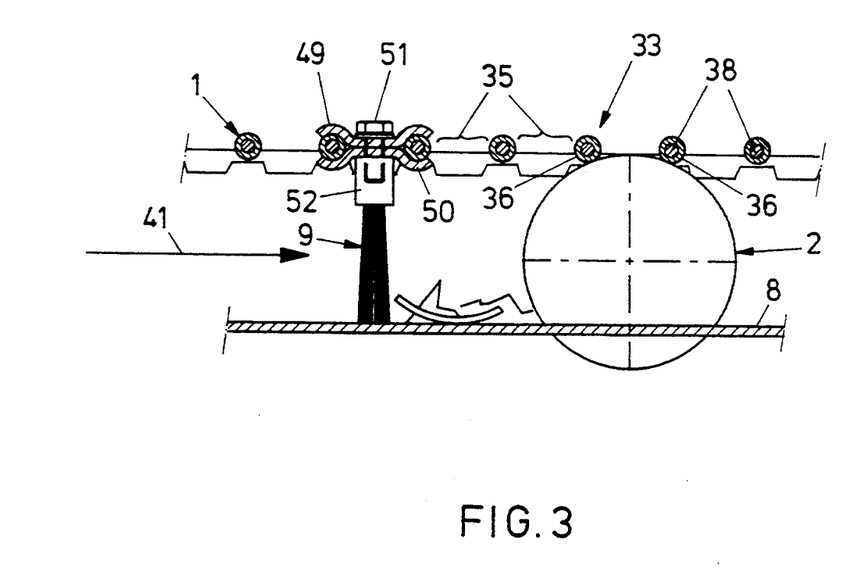
FIG. 3 is a more detailed side view of a portion of the apparatus shown in FIGS. 1 and 2.

Referring first to FIGS. 1–4, the shown apparatus according to the invention comprises a transport track generally indicated by reference numeral 33 and formed by an upper portion of a main conveyor belt 1 between pulleys 5, 6 about which the belt 1 is tensioned, collecting means 8 under a section of the main transport track 33, and belt guides 2 supported by a frame portion 4 and positioned along that section of the main transport track 33. The main conveyor belt 1 is provided with openings 35 (FIGS. 2 and 3). Mutually contacting surfaces 36, 37 of the main conveyor belt 1 respectively the belt guides 2 are profiled such that movement of the main conveyor belt 1 along the main transport track 33 causes a portion of the belt 1 passing the guides 2 to shake in a direction substantially transverse to the direction of the main transport track 33 (arrow 41). The conveyor belt 1 is further tensioned about a tensioner pulley 34.

Upstream of the main transport track 33 a feeding conveyor 30 is provided for feeding recyclable waste material to be sorted in the direction of the arrow 30A onto the main conveyor belt 1 of the apparatus according to the invention.

Waste material deposited on the main conveyor belt 1 is passed along the belt guides 2. Each time when a part of the main conveyor belt 1 passes one of the belt guides 2, that part, and consequently also the waste material lying on that part, is shaked in a direction transverse to the direction of the main transport track 33. The shaking of the main conveyor belt 1 causes particles smaller than predetermined sizes to drop through the openings 35 and onto the collecting means 8. Generally, some of the smaller parts of the waste will immediately fall through the openings when the waste material is deposited onto the main conveyor belt 1.

The oscillations of the shaking action are exclusively directed substantially transversely to the direction of the main transport track 33 and the intensity of the shaking action is such that the smaller parts are just shaken out of the waste material. Thus, collisions between parts and especially larger objects of the waste material are to a large extent avoided. In as far as such collisions occur, generally the impact thereof is relatively low because of the relatively small differences in velocity between the objects and also because the objects will rarely hit each other in the middle. In turn, this results in a substantially reduced glass breakage. It is noted that shaking intensity can be set adjusted at a relatively low level since the transport of the waste material on the main conveyor belt 1 is controlled by the motion in transport direction (arrow 41) of that belt 1 so the shaking action does not have to contribute to this function.

Shaking of the waste material is achieved by guiding the main conveyor belt 1 in such a manner that only the parts of the belt 1 passing the belt guides 2 along the main transport track 33 are moved transversely to the main transport track 33. Consequently, no additional means for driving the shaking motion are required. At each moment during operation of the apparatus according to the invention, only parts of the main conveyor belt 1 are actually shaking transverse to the circulating motion of the main conveyor belt 1. The weight of these shaking parts is relatively small compared with the weight of a complete shaking screen or trough, so the shaking action brings about only relatively small oscillating loads. For these reasons, the apparatus according to the invention can be of a relatively light inexpensive construction. In addition, due to the relatively small oscillating loads exerted during operation, vibrations occurring during operation are of relatively low intensity and can therefore easily be damped and withheld from the surroundings of the apparatus.

Furthermore the reduced number of collisions between parts of the waste material and the reduced impact of such collisions results in a reduced noise emission during operation.

The main conveyor belt 1 comprises transverse rods 38 mutually spaced along the belt 1 and the openings 35 are provided in form of spacings between subsequent rods 38. The rods provide transversal bending stiffness for the main conveyor belt without substantially affecting longitudinal flexibility of the main conveyor belt 1. In addition, the rods 38 occupy little space in longitudinal direction of the main conveyor belt 1 leaving a large portion in longitudinal direction of the main conveyor belt 1 for the subsequent openings 35 between the respective rods 38. Since the openings 35 occupy a large part of the surface of the main conveyor belt 1, relatively little shaking action is sufficient to make substantially all the parts smaller than a size determined by the size of the openings fall through the openings.

Figure 6:
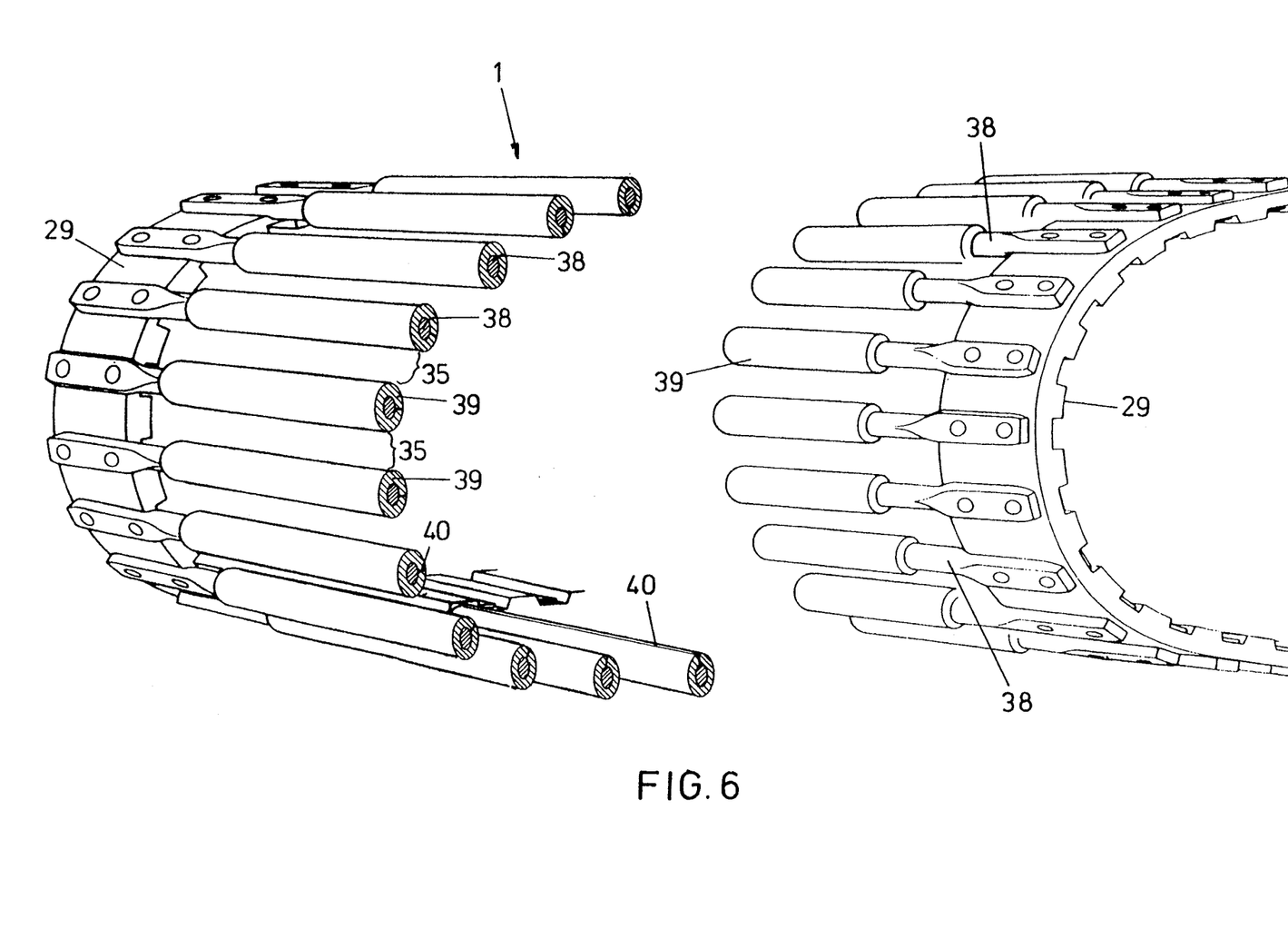
FIG. 6 is a sectional perspective view of a conveyor belt for use in an apparatus shown in the preceding figures.

In the apparatus shown a particularly large portion of the surface of the main conveyor belt 1 is available for the openings 35, since the main conveyor belt 1 further comprises a pair of mutually parallel, flexible carrying members 29 interconnected by the transverse rods 38 (see also FIG. 6). The parallel, flexible carrying members 29 occupy a very small fraction of the surface of the main conveyor belt.

To further reduce breakage of glass and noise emissions during operation, the rods 38 are each provided with a cover 39 (FIG. 6) of shock absorbing material in form of elastic tubes each with a longitudinal slit 40. The covers 39 are easily installed by pushing the slit 40 of each cover one of the rods 38 until the slit 40 of that cover 38 open and the rod 38 is pressed into the cover 39 in a direction transverse to its axes. In the apparatus shown, the covers 39 are provided in form of ends of so-called split polyvinyl chloride. This material is on the one hand sufficiently hard to shake the waste lying on the main conveyor belt 1 vigorously and to withstand wear for a long period of use. On the other hand this material is sufficiently soft to substantially reduce breakage of glass objects lying on the main conveyor belt 1. However, effective and durable covers can also be made from other plastic materials or even wood.

The openings 35 are each bounded by the covers 39 of subsequent rods 38, so that all the room available for the openings in longitudinal direction of the main conveyor belt 1 is used for the openings. The size of the openings in the main conveyor belt 1 can easily be changed by replacing the covers 39 by thicker or thinner covers. Removal and mounting of the covers 39 can be carried out very quickly and without taking the main conveyor belt 1 apart by passing the respective rod 38 transversely through the longitudinal slit 40 provided in each cover 39.

The profiled contacting surfaces 36 of the main conveyor belt 1 are provided in form of portions of the circumferential surfaces of the rods 38. When in a position corresponding with the position of one of the belt guides 2, these portions of the rods 38 directly contact the respective belt guide 2. Each time a rod 38 arrives at one of the belt guides 2, it is guided by that belt guide 2 in such a manner that, in addition to its movement in the direction of transport (arrow 41), that rod 38 is also urged upwards over that belt guide 2, causing the material lying on the belt 1 to be shaken, similar to the contents of a vehicle passing over a bump. It is noted that the belt guides may also be provided to cause movement of the passing belt portions in a horizontal direction transverse to the transport track. However, to minimize damage to the glass objects on the belts, vertical shaking is preferred.

The belt guides 2 are provided in form of rotatable wheels to reduce friction and wear of the belt guides 2 and the rods 38. To reduce noise emissions and excessive shocks, the wheels and/or the rods are preferably provided with resilient material such as rubber.

Figure 4:
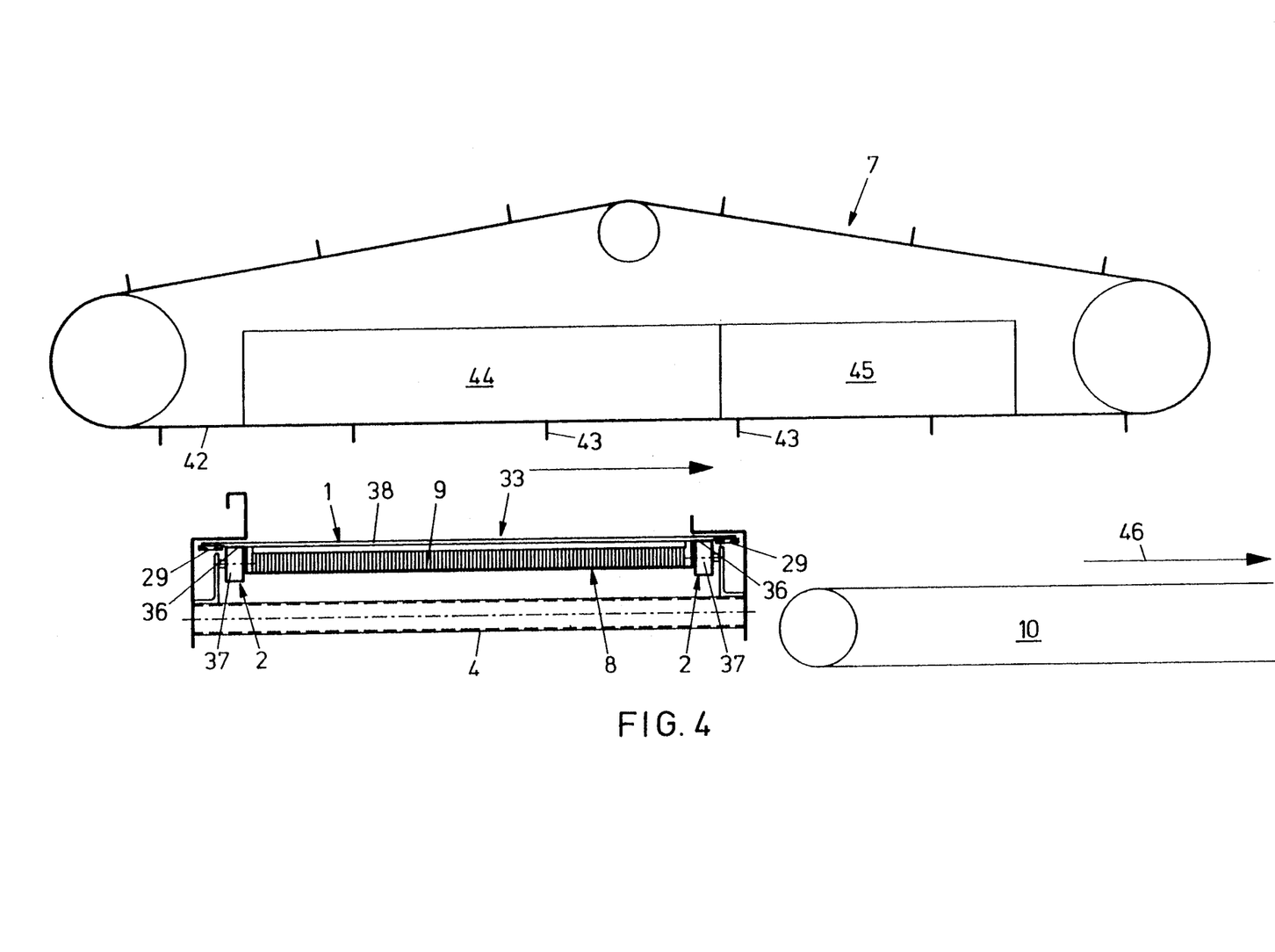
FIG. 4 is a side sectional view along the line IV—IV in FIG. 1.

Above a second section of the main transport track 33, magnet means 7 are provided to separate materials responsive to magnetism from the other material on the main conveyor belt 1. The magnet means 7 comprise a transverse conveyor belt 42 disposed above the main conveyor belt 1 defining the main transport track 33 and forming a downward facing transverse transport track leading away sideways from the main transport track 33. The conveyor belt 42 of the magnet means 7 comprises transverse ribs 43. Behind the portion of the belt 42 in the transverse transport track magnetic members 44, 45 are provided for pulling material responsive to magnetism upward from the main conveyor belt 1 below and for keeping that material pulled upward until it is transported to a position beyond the magnetic members 44, 45, where it is dropped onto a discharge belt conveyor 10 and transported away in the direction of the arrow 46 (FIGS. 2 and 4).

Separating the material responsive to magnetism from the main conveyor belt 1 on which it is also shaken to sort out the smaller objects brings about the advantage that the glass material does not need to be passed from one conveyor onto another so breakage of glass when falling from one conveyor onto another is reduced. Theoretically, depositing the material onto the conveyor belt 1 provided with openings 35 before passing it along the magnet means 7 would result in a loss of smaller parts of material responsive to magnetism. In practice however, most parts out of material responsive to magnetism are not very small. Generally a major part of this material consists of cans. Moreover, parts of steel and the like generally do not break during collection and handling so reduction of the size of these parts after disposal does not occur.

In the apparatus according to the shown embodiment of the invention, the first section in which the belt guide 2 are disposed and the second section above which the magnet means 7 are positioned overlap each other. More in particular, in longitudinal direction, the magnetic means 7 are positioned about centrally above the group of belt guides 2. Due to the above-mentioned overlap between the first and the second section of the transport track 33, the waste material is shaken while in the area under the magnet means 7, a substantial portion of the parts of the waste material responsive to magnetism but lying under or otherwise held back by parts which are not responsive to magnetism are freed and enabled to move to the magnet means 7 under influence of the magnetic forces exerted by the magnet means 7. In the shown apparatus, this effect is repeatedly obtained along the entire second section of the transport track 33 under the magnet means 7. Furthermore the distance along the transport track 33 between the end of the feeding conveyor 30 and the magnet means 7 is short so that only a small portion of the small parts responsive to magnetism falls through the main conveyor belt 1.

Since the transport track 33 is oriented substantially horizontally, movement of the waste material relative to the main conveyor belt 1 in the direction of the transport track 33 is almost completely avoided. This further contributes to the reduction of glass breakage.

The collecting means comprise a collecting surface 8 substantially parallel to the adjacent section of the transport track 33 and the conveyor belt 1 comprises sweeping means 9 which extend to the collecting surface 8 when in a position above the collecting surface 8. When the main conveyor belt 1 circulates in the direction of the arrow 41, particles lying on the collecting surface 8 are swept from the collecting surface 8 in the same direction and by the sweeping means 9. Downstream of the collecting surface 8 a transverse discharge conveyor 11 is positioned. Parts of the waste that are swept from the collecting surface 8 are deposited onto the transverse discharge conveyor 11 and transported away in a direction transverse to the main conveyor 1. Instead of the transverse conveyor 11 it is of course also possible to position for example a waste container or a transverse sliding trough immediately downstream of the collecting surface.

An advantage of this construction is, that on the one hand, the distance between the main conveyor belt 1 and the collecting surface can be held relatively small so that the parts and objects falling through the openings 35 only fall over a relatively short distance and, on the other hand, the space immediately under the main conveyor belt 1 is reliably kept free of obstructions of waste material so that there is a minimal risk that the smaller parts of the waste materials will be prevented from falling through the main conveyor belt 1. The relatively short drop of the parts through the openings 35 onto the collecting surface 8 is in turn advantageous for reducing noise emissions and distribution of parts due to bouncing.

As appears most clearly from FIG. 3, the sweeping means 9 are each provided in form of a brush. Thus an effective sweeping effect is obtained with relatively simple means. Instead, the sweeping means can also be provided in another form such as in form of a flexible flap.

As best shown in FIG. 3, the sweeping means 9 are connected to a pair of subsequent rods 38 in such a manner, that sweeping means 9 extend to the collecting surface 8 when in a position above the collecting surface 8. The sweeping means comprise a pair of clamping brackets 49, 50 clamped about a pair of subsequent rods 38 of the main conveyor belt 1 and held together between a bolt 51 and a brush 52. The sweeping means 9 can easily be replaced by removing the bolt 51 and replacing the old brush 52 by a new brush. Also the number of sweeping means can be adjusted in a simple manner, because to each pair of subsequent rods 38 a sweeping means 9 can be attached.

The shown apparatus further comprises an air stream separator 12 positioned along a further section of the main transport track 33 formed by the main conveyor belt 1. The waste material is transported to the air stream separator 12 on the main conveyor belt 1, i.e. without being discharged onto another conveyor belt. Thus a further major contribution to the reduction of glass breakage is obtained. It is noted that in connection with the use of the same transport means for both shaking the waste material and passage of the waste material to and along the air stream separator 12, it is an important feature of the main conveyor belt 1 and the cooperating guide means 2, that it provides a simple construction for transport through a first section of the main transport track while shaking the material transverse to the transport track and transport through another portion of the transport track without shaking the material. To achieve this, other belt guides 3 outside the first section of the transport track 33 are positioned to contact the flexible carrying members 29 of the main conveyor belt 1 (see FIG. 5) and provided with a corresponding profile (not shown), such that a portion of the main conveyor belt 1 is not substantially shaked transverse to the transport track 33 when passing the other belt guides 3. The other belt guides 3 are also supported by a frame portion 4.

Figure 5:
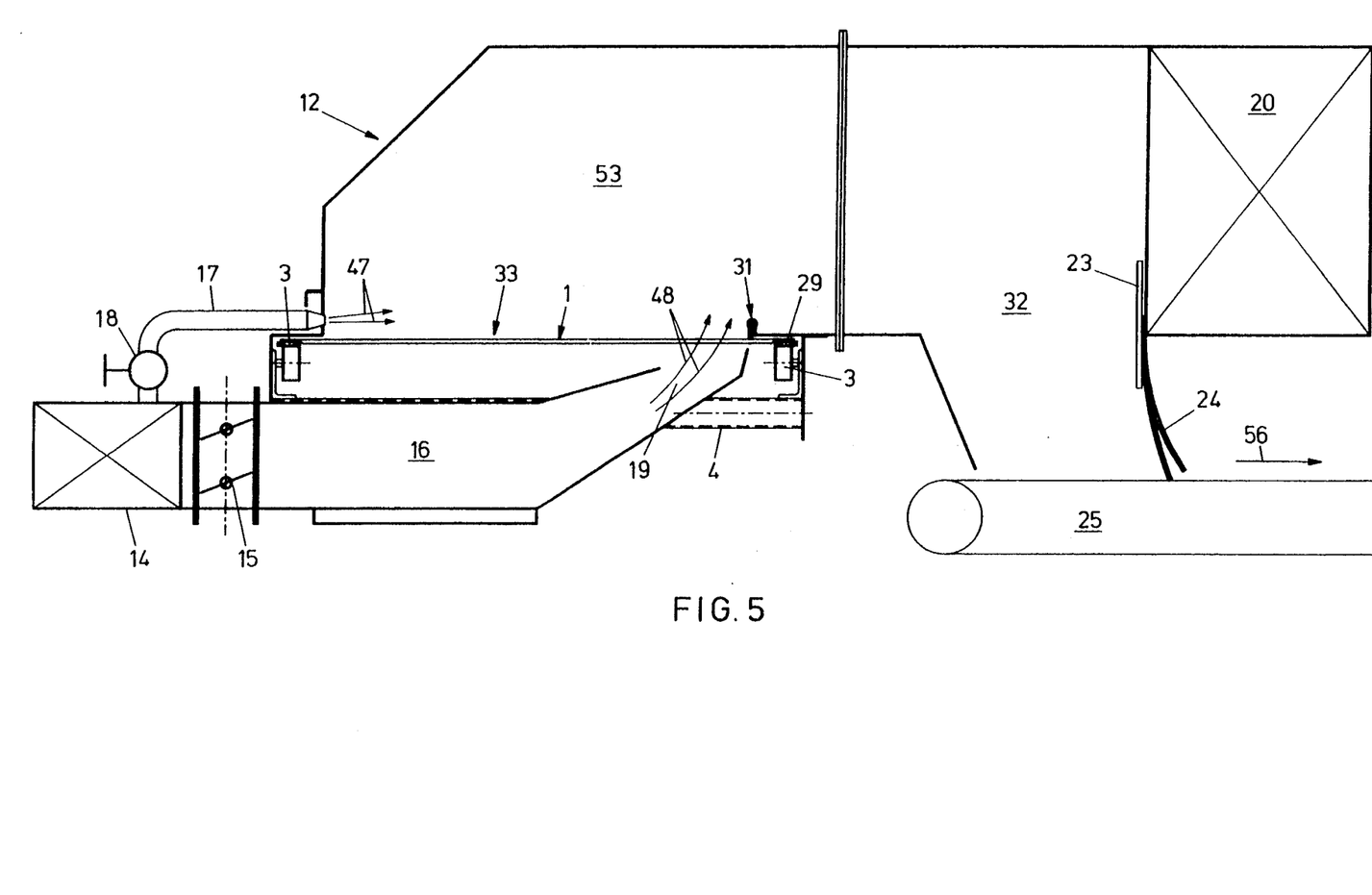
FIG. 5 is a side sectional view along the line V—V in FIG. 1.

Referring to FIGS. 1, 2 and 5, the air stream separator 12 comprises a blower 13, a distributing chamber 14, lateral air outlets 17 positioned above and directed across the main transport track 33 and a transverse channel 16 under the transport track 33 leading to a lower air outlet 19 also below the main transport track 33 and directed upward through a zone of the main conveyor belt 1 adjacent the side of the transport track 33 remote from the lateral air outlets 17. Both the lateral and the lower air outlets 17 and 19 communicate with the blower 13 via the distributing chamber 14.

During operation, the lateral air outlets 17 create a current of air (arrows 47) carrying specifically light objects, i.e. plastic and aluminum objects away sideways from the transport track 33. With the distance to the lateral air outlets 17, the current of air dissipates and reduces in strength. The lower air outlet 19 below the main transport track 33 serves to avoid that objects blown sideways fail to pass the area of the transport track 33 and in particular guiding rib 31 opposite the lateral air outlets 17. A current of air (arrows 48) is blown upwards out of the lower air outlet 19 and through the main conveyor belt 1, exerting a lifting force on objects in that area so that what is left in this area of the air current coming from the lateral air outlets 17 is sufficient to move the lighter objects away from the transport track 33. This solution is preferred over the solution of simply increasing the power of the air current coming out of the lateral air outlets 17, since this would also cause lighter glass objects passing at the side of the lateral air outlets to be blown sideways with such force, that a substantial increase of glass breakage would occur.

The shown main conveyor belt 1 causes relatively little resistance for the upward air current since it has a very open structure with large openings 35, subsequent openings 35 being separated only by respective ones of the transverse rods 38, with or without covers 39. In addition, due to the round shape thereof, the rods 38 or the covers 39 as such cause relatively little resistance to the upward current of air. To further reduce the resistance to the upward current of air caused by the rods 38 and/or the covers 39, the rods can be provided with cross-section elongate in a direction transverse to the main conveyor belt. An additional advantage of such a cross-section is, that the size of the rods and the covers in the direction of the main conveyor belt can be reduced.

The air stream separator 12 further comprises a duct 53 extending across the transport track 33 and provided with an entry gate 54 at its side facing the magnet means 7 and an exit gate 55 at its side remote from the magnet means 7. The further section of the transport track 33 is located within that duct 53. The duct 53 guides parts that are blown from the main transport track 33 towards a discharge conveyor 25 extending transverse to the main transport track 33 and driveable to circulate in the direction of the arrow 59.

As described above, the intensity of the current of air (arrows 47) across the main transport track 33 decreases with the distance to the lateral air outlets 17. This effect is increased since remote from the lateral air outlets 17, the duct 53 splits up in an upper branch 20 and a lower branch 32. Heavier objects such as aluminium cans and plastic containers fall into the lower branch 32 and onto the discharge conveyor 25. Lighter object such as paper and thin cardboard objects pass into the upper branch 20 which ends above the discharge conveyor 11 along which also the smaller parts which have fallen onto the collecting surface 8 are discharged. The end of the upper branch 20 of the duct 53 is provided with grate openings 56, 57 facing in different directions and causing a further decrease of the intensity of the current of air carrying the separated parts along so that these parts fall onto the discharge conveyor 11.

An adjustable guiding board 23 is provided between the upper and the lower branch of the duct 53. If the guiding board 23 is adjusted upwards, less parts pass above the guiding board 23 so that the lower limit of the specific weight of the articles that generally descend into the lower branch 32 is lowered. If the guide board 23 is lowered the lower limit of the specific weight of the articles that generally descend into the lower branch 32 will lie at a higher level.

The end of the lower branch 32 of the duct 53 is provided with flexible strips 24 limiting the amount of air streaming out through the lower branch 32 of the duct 53. Thus the main part of the air coming out of the outlets 17 and 19 is directed into the upper branch 20 of the duct 53 for reliably carrying the lightest waste material to the discharge conveyor 11 which also discharges material swept from the collecting surface 8.

If a device for generating Eddy-currents is used for separating the metals non-responsive to magnetism, this device is preferably positioned along the discharge conveyor 25 downstream (in the direction of the arrow 59) from the air stream separator 12. In this position, the parts of metal non-responsive to magnetism only have to be separated from the plastic which is easier than separating these parts from between heavy pieces such as glass jars.

Above the transport track 33 and in the area of the exit gate 55 a rotating brush 26 is provided. This brush is operatively connected with driving means for brushing light objects in the direction of the entry gate 54. Specifically light objects which have not been caught and blown away by the air jets 47, 48 out of the outlets 17 and 19 are brushed back into the duct 53 when they reach the exit gate 55, so that these objects are as yet blown away. The brush 26 also reduces the amounts of air escaping through the exit gate 55.

The shown apparatus comprises a plurality of lateral air outlets 17 in form of nozzles positioned in line along the main transport track 33 and throttle valves 18 of each associated with one of the lateral air outlets 17 for individually controlling the output of each of the lateral air outlets 17. Thus the intensity of the air jets 47 across the main transport track 33 can be adjusted to vary with the position along the track 33. If for example some subsequent throttle valves 18 are adjusted so that the air jet coming out of the associated downstream (in the direction of the arrow 41) nozzle 17 is stronger than the air coming out of the upstream nozzle 17, some parts that are not blown away by the upstream nozzle 17 are blown away by the downstream nozzle 17. Thus an even distribution across the duct 53 of parts carried through that duct can be achieved. Furthermore, if the throttle valves 18 associated with the first and the last nozzles 17 are adjusted to let through more air than the valves 18 associated with the nozzles 17 inbetween, drag along the side walls of the duct 53 can be compensated to obtain a more even distribution of air speeds across the duct 53. Instead of throttle valves 18 also others means for controlling the flow of air through the nozzles 17 can be used, such as a plurality of blowers each associated with one or more of the nozzles 17. Furthermore, if a more simple embodiment of the apparatus according to the invention is desired, it can also be contemplated to provide only a single lateral air outlet. Such a single lateral air outlet can be formed in a particular shape to obtain the desired distribution across the duct of the air current.

The air stream separator 12 further comprises throttle valves 15 for individually controlling the output of the lower air outlet 19 so the upward current (arrows 48) of air can be adjusted to be sufficiently strong to lift specifically light objects high enough to cause that these object are carried away by the transversal current of air (arrows 47) originating from the lateral outlets 17 but without disturbing the transversal current to much or blowing the object up to high.

The feeding conveyor 30 with a discharge end located above the main transport track 33 for feeding waste onto the main transport track, is oriented such that the centre lines of the main transport track 33 and this feeding conveyor 30 extend substantially in a common vertical plane. Downstream in the direction of the arrow 41 of the main transport track 33 a discharge conveyor 28 is provided for discharging the remaining glass fraction of the waste fed to the apparatus according invention. The receiving end of this discharge conveyor 28 is located under the downstream end of the main transport track 33 for depositing separated waste-glass from the main transport track 33 onto the discharge conveyor 28. Also this discharge conveyor 28 is oriented such that its centre line and the centre line of the main transport track 33 extend substantially in a common vertical plane.

The above-described orientation of the conveyors upstream and downstream of the main transport track 33 brings about the advantage, that parts of the waste dropping onto the next conveyor do not collide with others parts that were previously transported in respective positions laterally spaced from the first mentioned parts. Such collisions occur regularly when in top plan view a downstream belt conveyor extends under an angle with respect to an upstream belt conveyor.

I claim:

1. An apparatus for separating recyclable waste comprising a conveyer belt transport track along which a conveyer belt extends, the conveyer belt transport track including a first and a second section, collecting means under the first section of the conveyer belt transport track, belt guides positioned along the first section of the conveyer belt transport track, the conveyer belt being provided with openings and at least one of mutually contacting surfaces of the conveyer belt and the belt guides being profiled such that movement of the conveyer belt along the conveyer belt transport track causes a portion of the belt passing the guides to shake in a direction substantially transverse to the conveyer belt transport track, and magnetic separating means above the second section of the conveyer belt transport track.

2. The apparatus according to claim 1 wherein the first and the second section overlap each other.

3. The apparatus according to claim 1, wherein the transport track is oriented substantially horizontally.

4. The apparatus according to claim 1 comprising an air stream separator positioned along a further section of the transport track formed by said conveyor belt.

5. The apparatus according to claim 4 wherein the air stream separator comprises a lateral air outlet positioned above the transport track and directed across the transport track and a lower air outlet below said further section of the transport track and directed upward through a zone of the conveyor belt adjacent the side of the transport track remote from the lateral air outlet.

6. The apparatus according to claim 1 wherein the collecting means comprise a collecting surface substantially parallel to the section of the transport track and the conveyor belt comprises at least one sweeping means which extend to the collecting surface when in a position above the collecting surface.

7. The apparatus according to claim 6 wherein the sweeping means is a brush.

8. The apparatus according to claim 1 wherein the conveyor belt comprises transverse rods mutually spaced along the belt.

9. The apparatus according to claim 8 wherein the openings are provided in form of spacings between subsequent rods.

10. The apparatus according to claim 8 wherein the conveyor belt comprises a pair of mutually parallel, flexible carrying members interconnected by the transverse rods.

11. The apparatus according to claim 8 wherein the rods are each provided with a cover of shock absorbing material such as plastic or wood.

12. The apparatus according to claim 11 wherein the covers are elastic tubes with a longitudinal slit.

13. The apparatus according to claim 11 wherein the openings are provided in form of spacings between the covers of subsequent rods.

14. The apparatus according to claim 8 wherein the rods, when in a position corresponding with the position of one of the belt guides, directly contact the respective belt guide.

15. The apparatus according to claim 8 wherein the collecting means comprise a collecting surface substantially parallel to the section of the transport track and the conveyor belt comprises at least one sweeping means connected to a pair of subsequent rods, said sweeping means extending to the collecting surface when in a position above the collecting surface.

16. The apparatus according to claim 1 wherein the belt guides are wheels.

17. The apparatus according to claim 4 comprising a duct crossing the transport track and provided with an entry gate at its side facing the magnetic separating means and an exit gate at its side remote from the magnetic separating means and wherein the further section of the transport track is located within the duct.

18. The apparatus according to claim 17 comprising a rotating brush positioned above the transport track and in the area of the exit gate, and operatively connected with driving means for brushing light objects in the direction of the entry gate.

19. The apparatus according to claim 5 comprising at least two lateral air outlets positioned in line along the transport track and control means each associated with one of the lateral air outlets for individually controlling the output of each of the lateral air outlets.

20. The apparatus according to claim 5 comprising control means for individually controlling the output of the lower air outlet.

21. A system comprising the apparatus according to claim 1 and a feeding conveyor with a discharge end located above the transport track for feeding waste onto the transport track, wherein the centre lines of the transport track and the conveyor for feeding extend substantially in a common vertical plane.

22. A system comprising the apparatus according to claim 1 and a discharge conveyor with a receiver end located under the transport track for discharging separated waste-glass from the transport track, wherein the centre lines of the transport track and the conveyor for discharging extend substantially in a common vertical plane.

23. An apparatus for separating recyclable waste comprising a conveyer belt transport track along which a conveyer belt extends, the conveyer belt transport track including a first and a second section, collecting means under the first section of the conveyer belt transport track, belt guides positioned along the first section of the conveyer belt transport track, the conveyer belt being provided with openings and at least one of mutually contacting surfaces of the conveyer belt and the belt guides being profiled such that movement of the conveyer belt along the conveyer belt transport track causes a portion of the belt passing the guides to shake in a direction substantially transverse to the conveyer belt transport track, and an air stream separator positioned along a further section of the conveyer belt transport track, the air stream separator comprising a lateral air outlet positioned above the conveyer belt transport track and directed across the conveyer belt transport track and a lower air outlet below the further section of the conveyer belt transport track, the lower air outlet directed upward through a zone of the conveyer belt adjacent the side of the conveyer belt transport track remote from the lateral air outlet.

24. The apparatus according to claim 23, additionally comprising magnetic separating means above the second section of the conveyer belt transport track.

25. The apparatus according to claim 23, additionally comprising a multisided duct crossing the conveyer belt transport track, the duct provided with an entry gate at the side facing the magnetic separating means, and an exit gate at the side remote from the magnetic separating means, wherein the further section of the conveyer belt transport track is located within the duct.

26. The apparatus according to claim 23, additionally comprising at least two lateral air outlets positioned in line along the conveyer belt transport track and control means each associated with one of the lateral air outlets for individually controlling the output of each of the lateral air outlets.

27. The apparatus according to claim 25, additionally comprising control means for individually controlling the output of the lower air outlet.

28. An apparatus for separating recyclable waste comprising a conveyer belt transport track along which a conveyer belt extends, the conveyer belt transport track including a first and a second section, collecting means under the first section of the conveyer belt transport track, the collecting means including a collecting surface substantially parallel to the first section of the conveyer belt transport track, belt guides positioned along the first section of the conveyer belt transport track, the conveyer belt being provided with openings and at least one of mutually contacting surfaces of the conveyer belt and the belt guides being profiled such that movement of the conveyer belt along the conveyer belt transport track causes a portion of the belt passing the guides to shake in a direction substantially transverse to the conveyer belt transport track, and the conveyer belt including at least one sweeping means which extend to the collecting surface when in a position above the collecting surface.

29. The apparatus of claim 28, wherein the sweeping means is a brush.

30. An apparatus for separating recyclable waste comprising a conveyer belt transport track along which a conveyer belt extends, the conveyer belt transport track including a first and a second section, collecting means under the first section of the conveyer belt transport track, the collecting means including a collecting surface substantially parallel to the first section of the conveyer belt transport track, belt guides positioned along the first section of the conveyer belt transport track, the conveyer belt being provided with openings and at least one of mutually contacting surfaces of the conveyer belt and the belt guides being profiled such that movement of the conveyer belt along the conveyer belt transport track causes a portion of the belt passing the guides to shake in a direction substantially transverse to the conveyer belt transport track, the conveyer belt additionally comprising transverse rods mutually spaced along the conveyer belt and at least one sweeping means connected to a pair of subsequent rods, the sweeping means extending to the collecting surface when in a position above the collecting surface.

31. An apparatus for separating recyclable waste comprising a conveyer belt transport track along which a conveyer belt extends, the conveyer belt transport track including a first and a second section, collecting means under the first section of the conveyer belt transport track, belt guides positioned along the first section of the conveyer belt transport track, the conveyer belt being provided with openings and at least one of mutually contacting surfaces of the conveyer belt and the belt guides being profiled such that movement of the conveyer belt along the conveyer belt transport track causes a portion of the belt passing the guides to shake in a direction substantially transverse to the conveyer belt transport track, magnetic separating means above the second section of the conveyer belt transport track, and a multi-sided duct crossing the conveyer belt transport track, the duct provided with an entry gate at the side facing the magnetic separating means, and an exit gate at the side remote from the magnetic separating means, wherein the further section of the conveyer belt transport track is located within the duct.

32. The apparatus according to claim 31, additionally comprising a rotating brush positioned above the conveyer belt transport track and in the area of the exit gate, the rotating brush being operatively connected with driving means for brushing light objects in the direction of the entry gate.

* * * * *